(12) United States Patent
Howlett et al.

(10) Patent No.: US 7,428,452 B2
(45) Date of Patent: Sep. 23, 2008

(54) SCHEDULING METHOD AND SYSTEM FOR RAIL NETWORKS

(75) Inventors: Philip George Howlett, Fairview Park (AU); Peter John Pudney, Yatala Vale (AU)

(73) Assignee: Ausrail Technologies Pty Limited (AU)

( * ) Notice: Subject to any disclaimer, the term of this patent is extended or adjusted under 35 U.S.C. 154(b) by 256 days.

(21) Appl. No.: 10/517,352

(22) PCT Filed: May 20, 2003

(86) PCT No.: PCT/AU03/00605

§ 371 (c)(1),
(2), (4) Date: Jun. 24, 2005

(87) PCT Pub. No.: WO03/097425

PCT Pub. Date: Nov. 27, 2003

(65) Prior Publication Data

US 2005/0261946 A1    Nov. 24, 2005

(30) Foreign Application Priority Data

May 20, 2002    (AU) .................................. PS 2410

(51) Int. Cl.
*G05D 1/00* (2006.01)
*G05D 3/00* (2006.01)

(52) U.S. Cl. ................. 701/19; 700/28; 705/8; 246/2 R; 246/182; 295/1

(58) Field of Classification Search ............... 701/19; 246/2 R, 182; 705/8; 700/28; 295/1
See application file for complete search history.

(56) References Cited

U.S. PATENT DOCUMENTS

| 5,177,604 | A | * | 1/1993 | Martinez ................. 725/144 |
| 5,177,684 | A | * | 1/1993 | Harker et al. ............ 701/117 |
| 5,623,413 | A | * | 4/1997 | Matheson et al. ........ 701/117 |
| 5,794,172 | A | * | 8/1998 | Matheson et al. ........ 701/117 |
| 6,154,735 | A | * | 11/2000 | Crone ..................... 706/45 |
| 6,430,496 | B1 | * | 8/2002 | Smith et al. ............. 701/117 |
| 7,085,775 | B2 | * | 8/2006 | Short et al. .............. 707/104.1 |

(Continued)

FOREIGN PATENT DOCUMENTS

DE    19950186    4/2001

(Continued)

OTHER PUBLICATIONS

DARYN-a distributed decision-making algorithm for railway networks: modeling and simulation; Iyer, R.V.; Ghosh, S.; Vehicular Technology, IEEE Transactions on; vol. 44, Issue 1, Feb. 1995 pp. 180-191; Digital Object Identifier 10.1109/25.350284.*

(Continued)

*Primary Examiner*—Cuong H Nguyen
(74) *Attorney, Agent, or Firm*—Bose McKinney & Evans LLP

(57) ABSTRACT

A method and system for calculating a plan for moving trains on a network to reduce the cost of delays or late running. The method and system can be used to develop a timetable for real time dynamic rescheduling of trains on a network and for assessing proposed changes to network infrastructure.

7 Claims, 6 Drawing Sheets

Network model showing segments and stations enclosed by broken lines.

U.S. PATENT DOCUMENTS 7,092,894 B1 * 8/2006 Crone .......................... 705/8

FOREIGN PATENT DOCUMENTS

| WO | WO 01/49548 | 7/2001 |
|---|---|---|
| WO | WO 01/49550 | 7/2001 |
| WO | WO 01/62573 | 8/2001 |

OTHER PUBLICATIONS

Computer-aided train dispatch; Vieira, P.; Gomide, F.; Spectrum, IEEE; vol. 33, Issue 7, Jul. 1996 pp. 51-53 ☐☐Digital Object Identifier 10.1109/6.526866☐☐.*

Short-term hydro generation and interchange contract scheduling for Swiss Rail: Christoforidis, M.; Awobamise, B.; Frowd, R.J.; Rahimi, F.A.; Tong, S.; Aganagic, M.; Power Systems, IEEE Transactions on; vol. 11, Issue 1, Feb. 1996 pp. 274-280; Digital Object Identifier 10.1109/59.486106.*

Predictive and reactive approaches to the train-scheduling problem: a knowledge management perspective; Isaai, M.T.; Cassaigne, N.P.; Systems, Man, and Cybernetics, Part C: Applications and Reviews, IEEE Transactions on vol. 31, Issue 4, Nov. 2001 pp. 476-484; Digital Object Identifier 10.1109/5326.983931.*

Planning and operation of the Erie railroad main line radio communications system; Young, W.J.; Vehicular Communications, Transactions of the IRE Professional Group on; vol. 4, Issue 1, Jun. 1954 pp. 91-98.*

Planning for high-speed ground transportation; Hansen, R.J.; Proceedings of the IEEE vol. 56, Issue 4, Apr. 1968 pp. 472-486.*

A methodology for generation of optimal schedules for an underground railway system; Cury, J.; Gomide, F.; Mendes, M.; Automatic Control, IEEE Transactions on; vol. 25, Issue 2, Apr. 1980 pp. 217-222.*

Online rescheduling of mass rapid transit systems: fuzzy expert system approach; Chang, C.S.; Thai, B.S.; Electric Power Applications, IEE Proceedings—vol. 143, Issue 4, Jul. 1996 pp. 307-316.*

A methodology for generation of optimal schedules for an underground railway system; Cury, J.E.; Gomide, F.A.C.; Mendes, M.J.; Decision and Control including the Symposium on Adaptive Processes, 1979 18th IEEE Conference on; vol. 18, Part 1, Dec. 1979 pp. 897-902; Digital Object Identifier 10.1109/CDC.1979.270075.*

Study on itelligent train dispatching; Li Ping; Nie Axin; Jia Limin; Wang Fuzhang; Intelligent Transportation Systems, 2001. Proceedings. 2001 IEEE; Aug. 25-29, 2001 pp. 949-953; Digital Object Identifier 10.1109/ITSC.2001.948788.*

The revolution of railway system by using advanced information technology; Matsumoto, M.; Autonomous Decentralized Systems, 2000. Proceedings. 2000 International Workshop on; Sep. 21-23, 2000 pp. 74-80; Digital Object Identifier 10.1109/IWADS.2000.880889.*

A coordination technique in a highly automated train rescheduling system; Tsuruta, S.; Eguchi, T.; Yanai, S.; Ooshima, T.; Systems, Man, and Cybernetics, 1999. IEEE SMC '99 Conference Proceedings. 1999 IEEE International Conference on vol. 4, Oct. 12-15, 1999 pp. 601-606 vol. 4; Digital Object Identifier 10.1109/ICSMS.1999.812472.*

Evaluating strategies to improve railroad performance-a system dynamics approach; Homer, J.B.; Keane, T.E.; Lukiantseva, N.O.; Bell, D.W.; Simulation Conference Proceedings, 1999. Winter; vol. 2, Dec. 5-8, 1999 pp. 1186-1193 vol. 2 Digital Object Identifier 10.1109/WSC.1999.816839.*

Analyzing railroad dispatchers' strategies: a cognitive task analysis of a distributed team planning task; Roth, E.M.; Malsch, N.; Multer, J.; Coplen, M.; Systems, Man, and Cybernetics, 1998. 1998 IEEE International Conference on; vol. 3, Oct. 11-14, 1998 pp. 2539-2544 vol. 3; Digital Object Identifier 10.1109/ICSMC.1998.725040.*

Application of simulation models in capacity constrained rail corridors; Leilich, R.H.; Simulation Conference Proceedings, 1998. Winter; vol. 2, Dec. 13-16, 1998 pp. 1125-1133 vol. 2; Digital Object Identifier 10.1109/WSC.1998.745969.*

* cited by examiner

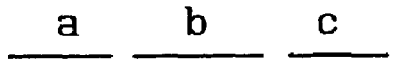 A station on a single line is modelled as a single track segment b. The set of possible movements on this network are (abc, cba).

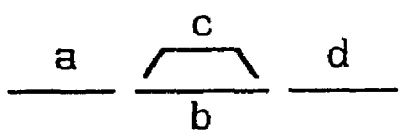 A loop on a single line is modelled as a pair of track segments b and c. The set of possible movements is (abd, acd, dba, dca).

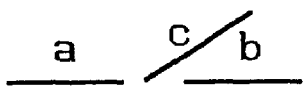 A junction can be modelled without additional tracks. The set of possible movements is (ab, ac, ba, ca).

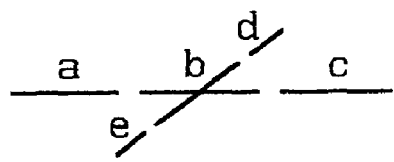 A diamond crossing requires an additional track segment b, to be defined.

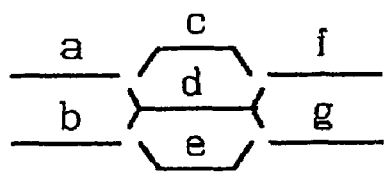 A centre refuge can be modelled using three track segments c, d, and e. If the refuge is on a double line then the set of movements is (acf, adf, gdb, geb).

Figure 1: track segments

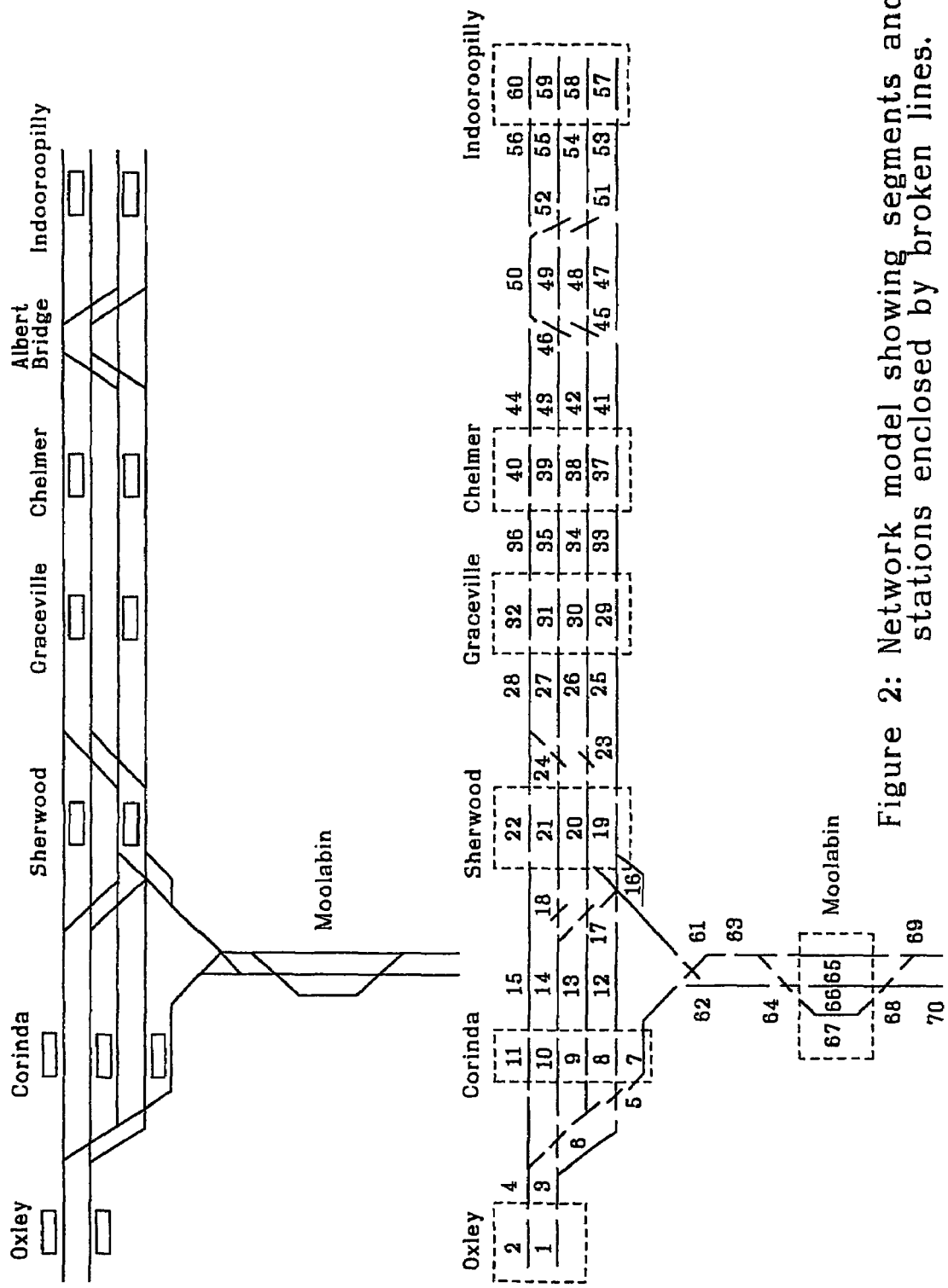
Figure 2: Network model showing segments and stations enclosed by broken lines.

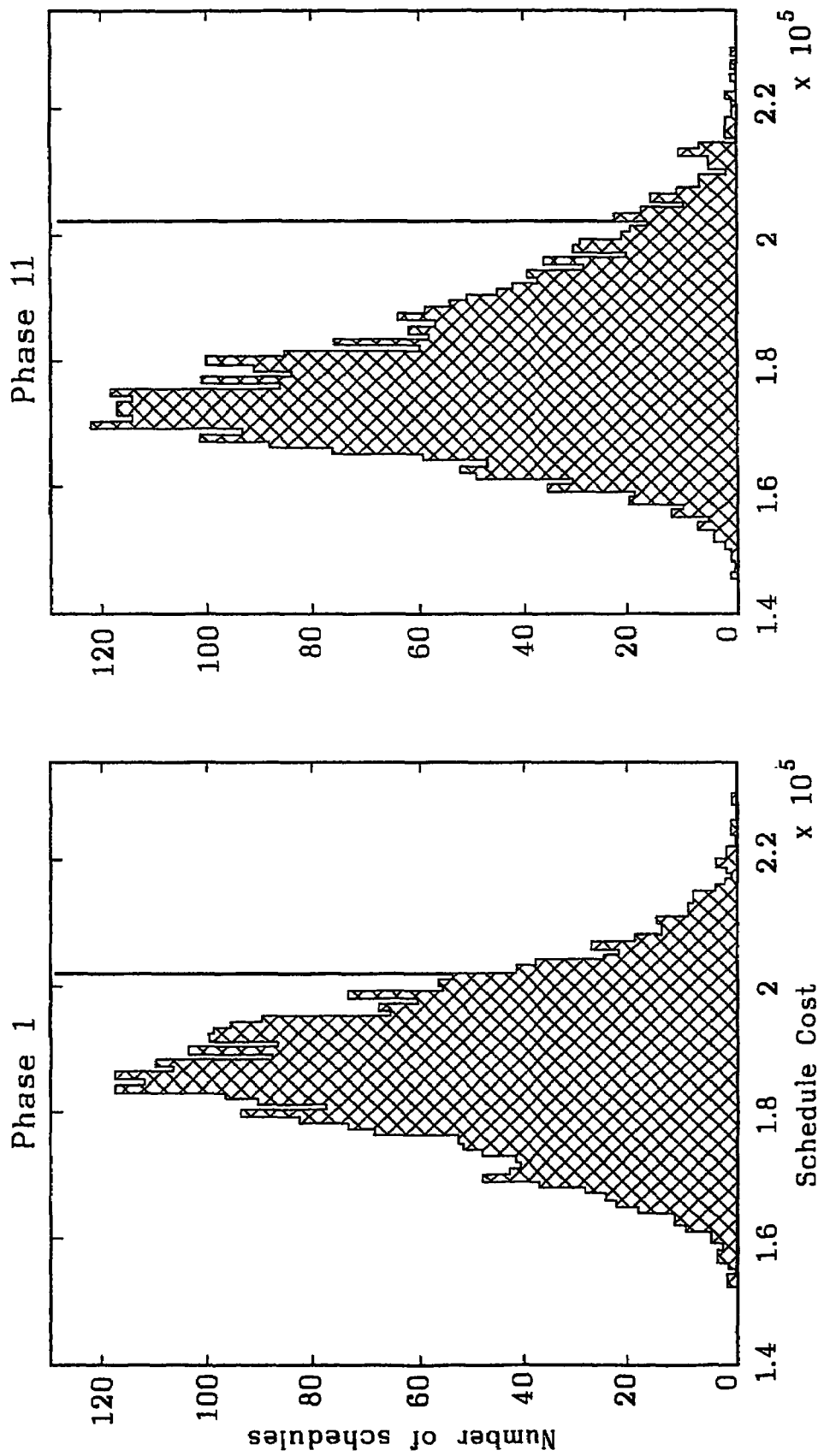
Figure 3: Results for the North Coast railway corridor.

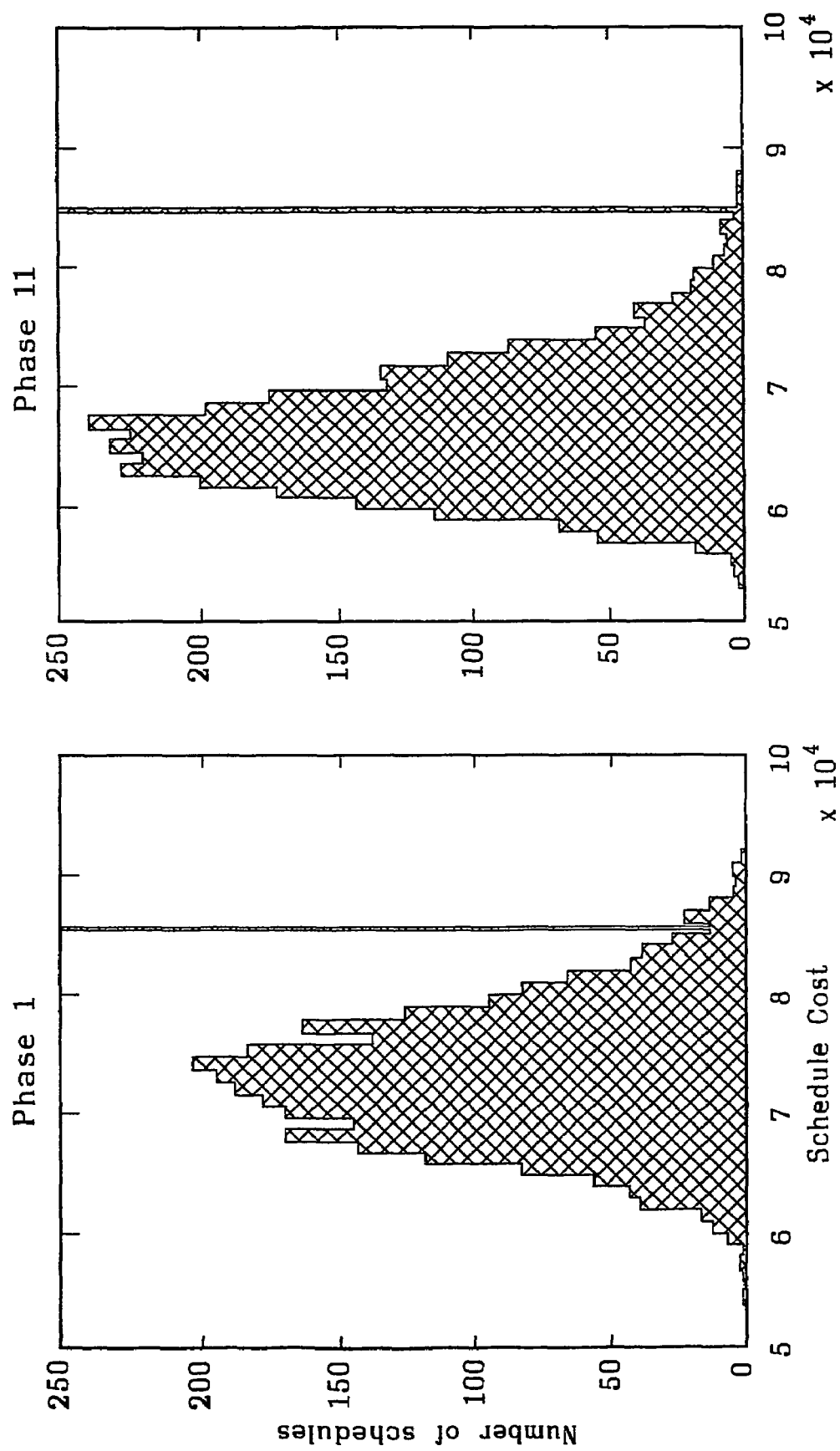
Figure 4: Results for the Sydney - Melbourne railway corridor.

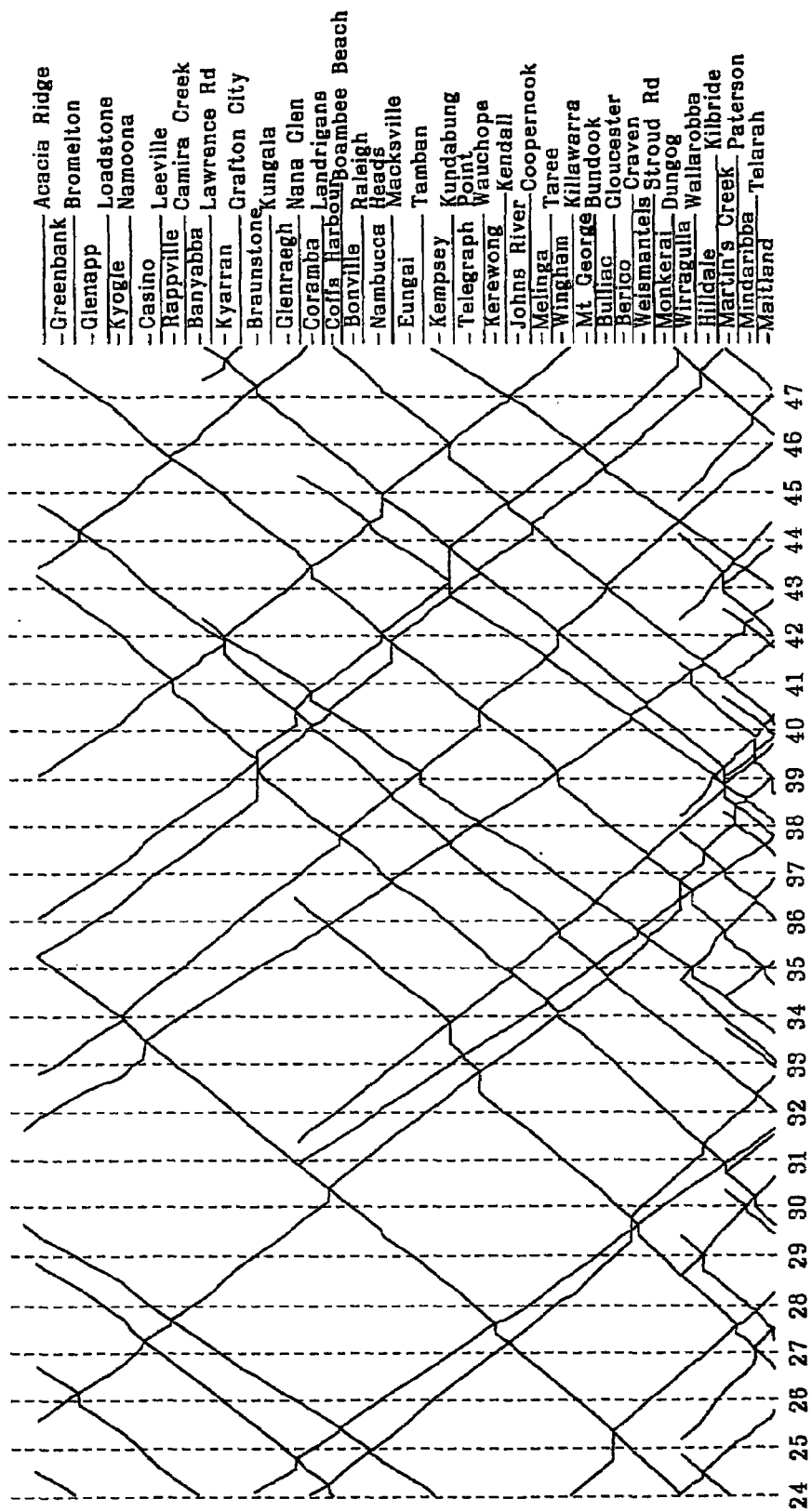
Figure 5: Crossing schedule for the North Coast rail corridor.

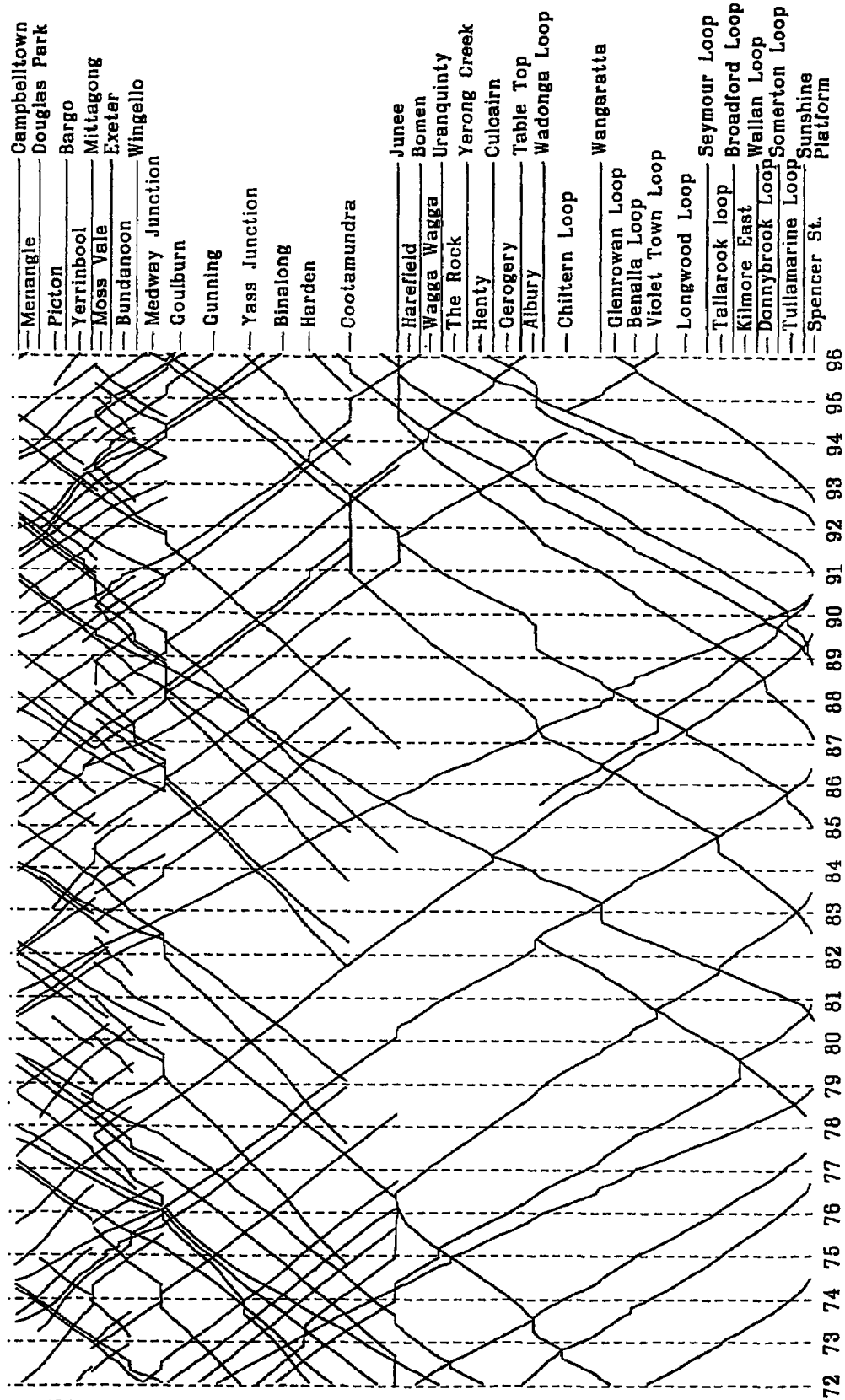
Figure 6: Crossing schedule for the Sydney – Melbourne rail corridor.

SCHEDULING METHOD AND SYSTEM FOR RAIL NETWORKS

FIELD OF THE INVENTION

The present invention provides a method and system for calculating a plan for moving trains on a network that reduces the cost of delays or late running. The invention is useful for timetable development, for real-time dynamic rescheduling of the trains on a network, and for assessing proposed changes to network infrastructure.

BACKGROUND TO THE INVENTION

Any discussion of the prior art throughout the specification should in no way be considered as an admission that such prior art is widely known or forms part of common general knowledge in the field.

In order for a scheduling tool to be useful as a realistic model of railway operations it should have the following features:
- The capability of representing a wide range of railway configurations including uni- and bi-directional track, junctions, branches, refuging or cross facilities etc.
- The ability to handle same direction overtakes.
- A check of the length of a train against the length of the crossing loop before allowing a cross to occur.
- The ability to take into account the characteristics of the signalling and safeworking systems.
- Accommodate all safety margins between the crossing and overtaking of trains to allow for signal changes.
- Allow trains to follow one another onto single line segments as governed by the signalling system in place.

It is an object of the present invention to provide a method and system for calculating a plan for moving trains on a network to overcome or ameliorate at least one of the disadvantages of the prior art, or to provide a useful alternative.

SUMMARY OF THE INVENTION

The invention provides a method and system for determining the efficient movement of trains on a network.

A further aspect of the invention provides methods for infrastructure planning, timetable planning and dynamic rescheduling.

One aspect of the present invention provides a method of moving a given set of trains from their respective origins to their respective destinations, said method comprising the steps of:
(i) form a schedulable set of trains consisting of all trains not at their destination that have at least one unoccupied link;
(ii) from this schedulable set select the train with the earliest start time from its current location, wherein this selected train is travelling from station $S_i$ to station $S_j$;
(iii) form a contender set of trains consisting of all trains that have as their next move a dispatch from station $S_i$ to $S_j$ and vice-versa;
(iv) from this contender set select the train with the earliest arrival time at its successor station (either station $S_i$ to $S_j$);
(v) for the selected train invoke a deadlock avoidance procedure wherein if this procedure accepts the train then go on to step (iv), or if the train is rejected then remove it from the schedulable set, and if the schedulable set is not empty then return to step (ii) otherwise go to step (vii);
(vi) schedule the selected train over its chosen link to its successor station; and return to step (i) until all trains are at their destination or the schedulable set is empty.

Typically the invention is implemented in the form of computer software operable to provide an operator of a train network with data for reducing the cost of delays or late running.

BRIEF DESCRIPTION OF THE DRAWINGS

FIG. 1 is a schematic view of a plurality of track segments.
FIG. 2 illustrates a network model showing segments and stations enclosed by broken lines.
FIG. 3 illustrates histogram results of a railway corridor.
FIG. 4 illustrates histogram results of another railway corridor.
FIG. 5 illustrates a crossing schedule for a rail corridor.
FIG. 6 illustrates a crossing schedule for another rail corridor.

DETAILED DESCRIPTION OF INVENTION

Modelling a Rail Network

Consider a railway system with the rail tracks modelled as a set of junctions and sections of rail joining them. The basic network unit of track is called a segment, defined below, and illustrated in FIGS. 1 and 2.

Track Segment: A track segment is a length of track which cannot be occupied by opposing trains. It is eliminated by either track junctions or signal points. A diamond crossing is a segment. Track segments have a length and a default direction. By assigning a default direction to segments, this model of a rail track system is a directed graph. In the present invention, an aggregated model of this directed graph is employed where these basic segments are partitioned into functional stations and links between them. The station definition includes physical stations but extends to any segment where a train may be scheduled to stop in our scheduling procedure. For example a crossing loop becomes a functional station for our purposes, because we may hold a train on the loop to enable another train to pass. Trains are moved strictly from station to station in our scheduling procedure.

Station: A station is a subset of track segments, at one geographical location, where trains may make scheduled stops and whence despatch decisions are made.

Stations are connected to each other by sequences of track segments with each feasible alternative sequence defining a path. A feasible path joining two stations is referred to as a link.

Link: A link is a sequence of track segments joining two stations in the track graph. The first and last segment in a link between stations $s_i$ and $s_j$ must be a track segment in station $s_i$ and $s_j$ respectively.

Although the track graph is a directed graph, by virtue of the assigned default directions, any (undirected) path is admitted as a link. It is possible and sometimes desirable, to route a train on a link traversing some segments in reverse direction.

Trains are superimposed onto the track digraph to model an operating railway system as a train network.

Train Network: A train network is a track digraph, a set of trains and a set of mappings relating to train dynamics through the network. A train is an object with attributes such as direction of travel, length, station of origin and destination station.

The state of the network is a representation of the location of each train in the system. The scheduling process is represented by the changing state of the system at a sequence of discrete timepoints or stages when decisions are made.

Trains may leave and enter the system during the scheduling planning horizon. Trains yet to be introduced into the system are located at a virtual source station and transfer trains exiting the network are allocated to a virtual sink station.

The normal scheduling task is to move each train through the network from its origin to destination. A train moves from station to station on a sequence of links joining intermediate stations on its selected path. The goal is to develop a scheduling procedure which optimises some objective measure of system performance. One aspect of the present invention provides a procedure aimed at minimising aggregate train lateness or a class of similar performance measures.

Train Movements

While a track segment can only accommodate one train at a time for trains travelling in opposite directions, if a track segment has internal signalling then it may be able to accommodate more than one train moving in the same direction. These following trains must be kept separated from each other by some minimum distance or time. This is achieved by having a following clearance time which governs the minimum separation between the front of following trains at entry and exit from a segment. This following clearance time will be a function of such things as train speed, the signalling system used, safety margins required and train length. An opposing clearance time is also needed to govern the minimum time separation between the front of one train leaving a segment and a train travelling in the reverse direction seeking to gain access to the same segment.

Deadlock

The issue of potential deadlock complicates the dispatch of trains particularly along single line corridors with passing loops. A feasible schedule requires that all trains can reach their destination without any train backing up.

Deadlock: A rail network is defined to be deadlocked if at least one train cannot reach its destination without one or more trains backing up.

In the present invention only a limited deadlock avoidance protocol is implemented. The first advantage is that it is possible to retain a rich set of potential schedules only discarding them at deadlock or near certain deadlock states. The second advantage is that the avoidance procedure is computationally efficient and speed of schedule generation is a requirement of the system. The problem space search method used to construct the schedules randomly perturbates segment running times of individual trains to influence the order in which trains are dispatched. With this randomised search procedure it is good enough to reduce the occurrence of deadlock and simply throw away schedules that terminate in deadlock. The only small disadvantage is the loss of some computational efficiency because some potential schedules are pursued further than necessary.

Optimisation

One aim of the present invention is to provide a method and system for constructing a timetable that minimises the operating costs of the rail network. These costs could include costs associated with:

delays at crossing loops lateness at key locations along a train's route

Mixed Integer Programming

In the present invention, the modelling of the problem as a mathematical program was inspired by the observation that this scheduling problem could (almost) be formulated as a job-shop problem, with track segments corresponding to machines and train journeys corresponding to sequences of job operations. A key difference between the scheduling problem for trains on a track network and the standard job-shop problem is that whereas jobs can be removed from one machine and put into a queue for the next machine, trains cannot be removed from the track after completing one track segment but before starting the next.

The track is assumed to be a sequence of track segments, numbered 1 . . . n in the outbound direction. Stations between adjacent segments are assumed to have unlimited capacity.

T is the set of trains i is an index for outbound trains j is an index for inbound trains $P_{lk}$ is the time taken for train l to traverse segment k $t_{lk}$ is the time train l starts segment k We define the function $$d_{lmk} = \begin{cases} 1 & \text{if train } l \text{ crosses segment } k \text{ before train } m \\ 0 & \text{otherswise} \end{cases}$$

The following precedence constraints ensure that the trains remain on each section of track for their minimum traversal time and are then allowed to proceed onto the next segment of track on their journey:

$$t_{ik} - t_{ih} \geq P_{ih}$$

$$t_{jh} - t_{jk} \geq P_{jk}$$

The following interference constraints ensure that no two trains occupy a single section of track at the same time:

$$t_{lk} - t_{mk} + M d_{lmk} \geq P_{mk} \forall l, m \in T, l \neq m$$

$$t_{mk} - t_{lk} + M[1 - d_{lmk}] \geq P_{lk} \forall l, m \in T, l \neq m$$

M is a large number.

We minimise the sum of the arrival times of individual trains. Minimising the make span allows non-critical trains to run slowly.

This mixed integer formulation has been implemented in GAMS (General Algebraic Modelling System) and can solve larger problems than our initial formulation, described below. It has been used to solve problems with 14 trains and 10 track segments. The main problem with this formulation is that it is for a single line track only, and assumes infinite capacity at stations. However, for such problems it generates optimal solutions that can be used to check the results of other timetabling methods.

The second mixed integer program models a single line railway corridor with stations connected by sections of track. Both the stations and the track sections are considered as machines and the trains as jobs. Each machine has a given maximum capacity. The stations are considered as a single unit with capacity equal to the sum of the number of crossing loops and mainline track segments at each station. It is assumed that each train can use any track segment in a station.

$A_{ij}$ arrival time of train i at machine j.

$D_{ij}$ departure time of train i from machine j.

$P_{ij}$ minimum time train i takes on machine j.

$C_j$ capacity of machine j.

$\delta_{ijt}$ indicator function which is equal to 1 if train i is on machine j at time t.

Sequencing Equations $$A_{ij}=D_{i,j-1} \text{ for all outbound trains } \forall j$$

$$A_{ij}=D_{i,j+1} \text{ for all inbound trains } \forall j$$

Location Indicator

Indicator to determine to location of train i at time time t.

$$\delta_{ijt} = \begin{cases} 1 & A_{ij} \leq t \leq D_{ij}, \\ 0 & \text{otherwise.} \end{cases}$$

$$\delta_{ijt}^A = \begin{cases} 1 & t > A_{ij}, \\ 0 & \text{otherwise.} \end{cases}$$

The location indicator $\delta_{ijt}$ is produced by the following five equations:

$$t-A_{ij} \geq M\delta_{ijt}^A$$

$$t-A_{ij} \geq -M(1-\delta_{ijt}^A)$$

$$t-D_{ij} \leq M\delta_{ijt}^B$$

$$t-D_{ij} \geq -M(1-\delta_{ijt}^B)$$

$$\delta_{ijt}=\delta_{ijt}^A \delta_{ijt}^B$$

Capacity Constraints $$\sum_i \delta_{ijt} \leq c_j \forall_{j,t}$$

Minimum Processing Time Constraints $$D_{ij}-A_{ij} \geq P_{ij} \forall i$$

The objective used is to minimise the makespan of the scheduling tasks. This second formulation is a non-linear program with discontinuous constraints.

Lagrangian Relaxation

Lagrangian relaxation has long been recognised as an effective solution method for constrained optimisation. Many computationally hard problems complicated by a set of difficult constraints can be decomposed into problems with a simpler structure. In our railway scheduling model the track capacity constraints are removed from the constraint set and placed in the objective function by the use of lagrange multipliers. These multipliers can be interpreted as the cost for using the track at a particular time. The higher the price on a track segment at a particular time the less likely it is to be used by trains at that time. This relaxed for of the scheduling problem allows us to reduce the problem to a series of shortest path problems for individual trains on the network. Trains are scheduled through the rail network one at a time through the matrix of prices (Lagrange multipliers) along their least cost path irrespective of other trains in the network. The solution of the relaxed problem with section capacity constraints removed may result in an infeasible schedule. A heuristic method must then be employed to remove the infeasible train movements and produce a feasible schedule.

The Lagrangian relaxation method is a common approach for solving large scale integer programs and is based on computing the solution to the dual problem. The optimal value for the dual problem provides a lower bound to the optimal value to the original problem. The upper bound together with the solution to the dual can be used to provide a good approximate solution to the original problem.

This method is successful for solving large problems provided the difference between the optimal values of the primal and dual is small and the method for solving the dual provides sufficient information for generating a nearly optimal feasible solution to the primal problem.

The main advantage of the lagrangean relaxation approach is that it produces both upper and lower bounds on the value of the objective function.

Using this Lagrangian relaxation method on several test problems it was found that the Lagrange multipliers oscillated and hence the primal and dual solutions did not converge or become sufficiently close at any iteration.

Problem Space Search

A heuristic is a technique which seeks good (near optimal) solutions to a problem at a reasonable computational cost without being able to guarantee optimality or state how close to optimally a feasible solution is. A heuristic can be thought of as a set of rules defining decision priorities. The dispatch procedure used is a greedy heuristic which builds a schedule by selecting which train to move next based only on local information.

Our solution method here uses the technique of problem space search. The problem space search technique is effective in a range of combinatorial optimisation problems including job shop scheduling and resource constrained project scheduling. The Problem Space Search method takes a fast problem specific heuristic and embeds it within a local search procedure. The definition of a search neighborhood is based on a heuristic problem pair (h, p) where h is the fast heuristic and p represents the problem data upon which decisions are made. Since a heuristic h is a mapping from a problem to a solution the pair (h, p) is an encoding of a particular solution. By perturbing the problem data p the dispatch procedure will generate alternative solutions within a neighbourhood governed by the size of the perturbations made to the problem data. In the construction of solutions built by the base heuristic from perturbed data we must use the original problem data. That is the perturbed data is used only to alter the decision process made by the dispatch procedure.

Below is described the dispatch procedure which moves a given set of trains from origin to destination minimising an objective function that is related to the delays experienced by the trains in the network.

1. Form a schedulable set of trains consisting of all trains not at their destination that have at least one unoccupied link.
2. From this schedulable set pick the train with the earliest start time from its current location. Assume this selected train is travelling from station $S_i$ to station
3. Form a contender set of trains consisting of all trains that have as their next move a dispatch from station $S_i$ to $S_j$ and vice-versa.
4. From this contender set select the train with the earliest arrival time at its successor station (either station $S_i$ to $S_j$).
5. For the selected train invoke the deadlock avoidance procedure. If this procedure accepts the train then go on to step 6. If the train is rejected then remove it from the schedulable set. If the schedulable set is not empty then return to step 2 otherwise go to 7.
6. Schedule the selected train over its chosen link to its successor station.
7. Return to step 1 until all trains are at their destination or the schedulable set is empty.

In the search for the optimal schedule we use a two phase approach. We first implement a simple problem space search by making perturbations on the variables start time, $st_i$, and finish time, $ft_i$. A train's start time $st_i$ is the time at which it is able to be scheduled from its current location in the schedule. Like the start time the finish time is a dynamic variable associated with each train. It is equal to the time that train i may arrive at its next station if dispatched next over its preferred available link. This value is a lower bound on a set of possible finish times for train i with the system in its current state.

In the second phase we use a population of the best solutions from the first phase to help direct the search towards refining low cost solutions found in the first phase.

The start time is used by the dispatch procedure to determine which two stations we schedule between. The finish time is then used to determine which train will be dispatched next between these chosen stations. In phase I of the solution process we perturb these two variables enabling the dispatch procedure to generate many different sequences of dispatch decisions. The size of $\epsilon$ of the perturbations added to the start and finish times is governed by the parameter $\alpha$ and is given by $$\epsilon = \alpha U(0,1)$$

where $U(0,1)$ is a uniformly distributed random variable on the interval $[0,1]$. At each decision point it is possible for any train with a start time within the interval $[st_{min}, st_{min}+\alpha]$, where $st_{min}$ is the minimum of the start times of all trains not a there destination, to be selected as the next dispatch. Thus by increasing the size of the parameter $\alpha$ we also increase the size of the set of possible next moves. By using a large value for $\alpha$ less importance is placed on the locally optimal decision and the size of the solution space the procedure is able to explore in increased. On the other hand using a too small value for a restricts the alternative solutions that the procedure is capable of generating. Small values for $\alpha$ are not likely to alter the decision making data sufficiently to generate a different solution sequence. Through experimentation we have found an appropriate value for $\alpha$ to be half the average inter station running time for all trains on the network.

In the second phase of the search process we take the best n schedules and examine them in sufficient detail to identify the good decisions in each. We have determined that a key aspect of the performance of good schedules is whether they incorporate the best passing rules at each station. We therefore bias the search towards pairwise passing strategies at each station which yield schedules with good global performance.

Long-haul Examples

The problem space search dispatcher has been tested on two Australian railway networks. The objective function is that is used to evaluate each schedule is the sum of the lateness of each train. The lateness of each train is given by the function $$Z^i(a_{id}) = \begin{cases} 0 & a_{id} \leq a_i^* \\ a_{id} - a_i^* & a_{id} > a_i^* \end{cases}$$

where $a_{id}$ is the actual arrival time of train i at is destination while $a_i^*$ is the desired arrival time.

The first of the test problems is the Australian North Coast Railway which runs from Maitland to Murwillumbah. This track consists of a single line corridor which 68 crossing loops and covers a distance of some 750 km. Forty two trains are to be schedules over the corridor—twenty one north bound and twenty one south bound. Some trains traverse the entire length of the railway corridor while others use varying portions of it.

A histogram of the results from both phase I and phase II of the problem space search can be found in Fig. 3. In both phases 3000 feasible schedules were constructed and the histograms have been plotted using buckets of 1000 seconds. The lowest cost schedule found in phase I had a cost of 152000 seconds while the overall best solution was found in phase II with a cost of 145000 seconds. As can be seen in FIG. 3 of the phase II distribution of solution costs has been significantly skewed towards the low cost end when compared with the results from phase I. The best solution found is represented as a train graph in FIG. 5. Current best practice for this same actual scheduling task on the North Coast line is 205000 seconds. This is shown as the vertical line in FIG. 3. Our procedure is therefore generating a raft of better schedules, the best being approximately 30% lower than current practice.

The second test problem is the Sydney to Melbourne corridor running between Campbelltown Sydney and Spencer Street Melbourne. The track from Campbelltown to Junee is double line track with crossing loops to allow overtaking while the section from Junee to Spencer Street is single line track with crossing loops. The track covers a distance of 750 km and has 59 crossing loops. Daily 118 trains are to be schedules through variations lengths of the railway corridor.

The results from both phases of the problem space search are presented in FIG. 4. Once again 3000 feasible schedules were constructed in both phases with the best schedule being found in phase II. The minimum cost schedule found in phase I was 53660 seconds while in phase II the best one found had a cost of 52945 seconds. Note the effect of the weights in skewing the histogram in phase II towards the low cost region. FIG. 6 shows the train graph of the best found solution. Current best practice for the Sydney to Melbourne scheduling task has a cost of 85000 seconds which is shown as the vertical line in FIG. 4.

In both of the above examples solutions within 10% of the best one found were generated in under 2 minutes.

The invention claimed is:

1. A method of moving a given set of trains from their respective origins to their respective destinations on a rail network, said method comprising:
   (i) forming a schedulable set of trains consisting of every train not at its destination;
   (ii) removing from said schedulable set any train whose next movement may result in the network becoming deadlocked;
   (iii) generating a dispatch decision time for each of the trains remaining in the schedulable set after having trains removed in step (ii), wherein the dispatch decision time is somewhere between the earliest time the train can start a next movement and the earliest time the train can complete its next movement;
   (iv) generating a perturbed dispatch decision time for each of the trains remaining in the schedulable set after having trains removed in step (ii) by adding a random perturbation to the dispatch decision time of each train;
   (v) selecting a train from said schedulable set with the earliest perturbed dispatch decision time;
   (vi) scheduling said selected train over its chosen movement to its successor station;
   (vii) repeating steps (i) to (vi) until the schedulable set is empty to create a possible schedule;

(viii) assessing said possible schedule by means of an objective function;

(ix) repeating steps (i) to (viii) to create N possible schedules; and (x) selecting a desired schedule from said N possible schedules on the basis of said objective function and moving said set of trains from their respective origins to their respective destinations on the rail network in accordance with said desired schedule.

2. The method of moving a given set of trains from their respective origins to their respective destinations on a railway network as claimed in claim 1, wherein said objective function is the sum of the lateness costs of each train, wherein the lateness cost of each train is zero if the train arrives at its destination before the desired arrival time, and some train dependent multiple of the lateness if the train arrives after the desired arrival time.

3. The method of moving a given set of trains from their respective origins to their respective destinations on a rail network as claimed in claim 1, wherein said objective function used to evaluate each schedule is the sum of the lateness of each train, wherein the lateness of each train is given by the function:

$$Z^i(a_{id}) = \begin{cases} 0 & a_{id} \leq a_i^* \\ a_{id} - a_i^* & a_{id} > a_i^* \end{cases}$$

where $a_{id}$ is the actual arrival time of train i at the destination while $a_i^*$ is the desired arrival time.

4. The method of moving a given set of trains from their respective origins to their respective destinations on a rail network as claimed in claim 1, wherein track capacity constraints are included in the objective function by means of lagrange multipliers.

5. The method of moving a given set of trains from their respective origins to their respective destinations on a rail network as claimed in claim 3, wherein track capacity constraints are included in the objective function by means of lagrange multipliers.

6. The method of moving a given set of trains from their respective origins to their respective destinations on a rail network as claimed in claim 1, wherein a heuristic method is used to remove any infeasible train movements.

7. The method of moving a given set of trains from their respective origins to their respective destinations on a rail network as claimed in claim 1, wherein the size of the perturbation $\epsilon$ added to the dispatch decision time is governed by the parameter $\alpha$ and is given by $$\epsilon = \alpha U(0,1)$$

where $U(0,1)$ is a uniformly distributed random variable on the interval $[0,1]$.

* * * * *